(12) United States Patent
Hammel et al.

(10) Patent No.: US 8,125,178 B2
(45) Date of Patent: Feb. 28, 2012

(54) DRIVE AND METHOD

(75) Inventors: Wolfgang Hammel, Bruchsal (DE);
Thomas Schuster, Ottenbach (DE)

(73) Assignee: Sew-Eurodrive GmbH & Co. KG,
Bruchsal (DE)

( * ) Notice: Subject to any disclaimer, the term of this patent is extended or adjusted under 35 U.S.C. 154(b) by 498 days.

(21) Appl. No.: 12/376,117

(22) PCT Filed: Jul. 17, 2007

(86) PCT No.: PCT/EP2007/006318
§ 371 (c)(1),
(2), (4) Date: Feb. 2, 2009

(87) PCT Pub. No.: WO2008/014881
PCT Pub. Date: Feb. 7, 2008

(65) Prior Publication Data
US 2010/0007304 A1    Jan. 14, 2010

(30) Foreign Application Priority Data

Aug. 1, 2006 (DE) .................. 10 2006 036 170
Jun. 13, 2007 (DE) .................. 10 2007 027 827

(51) Int. Cl.
*H02P 27/00* (2006.01)

(52) U.S. Cl. .............. 318/802; 322/89; 322/37; 322/24; 318/800; 318/804

(58) Field of Classification Search ............. 318/609, 318/400.06; 322/89, 37, 17, 24
See application file for complete search history.

(56) References Cited

U.S. PATENT DOCUMENTS

| | | | | |
|---|---|---|---|---|
| 3,805,135 | A * | 4/1974 | Blaschke | 318/803 |
| 4,585,985 | A * | 4/1986 | Bose | 318/803 |
| 4,808,903 | A * | 2/1989 | Matsui et al. | 318/800 |
| 5,959,429 | A * | 9/1999 | Tajima et al. | 318/799 |
| 6,169,335 | B1 * | 1/2001 | Horsak et al. | 307/10.1 |
| 6,335,605 | B1 * | 1/2002 | Negoro | 318/727 |
| 6,359,416 | B1 * | 3/2002 | Rao et al. | 318/727 |
| 7,103,425 | B1 * | 9/2006 | Marra et al. | 700/78 |
| 7,202,629 | B2 * | 4/2007 | Jadot et al. | 318/812 |

(Continued)

FOREIGN PATENT DOCUMENTS

DE    199 752    6/1907

(Continued)

OTHER PUBLICATIONS

International Bureau, Translation of International Preliminary Report on Patentability (including Written Opinion of the International Searching Authority), International Patent Application No. PCT/EP2007/006318, Feb. 26, 2009.

(Continued)

*Primary Examiner* — Walter Benson
*Assistant Examiner* — Jorge Carrasquillo
(74) *Attorney, Agent, or Firm* — Kenyon & Kenyon LLP (57) ABSTRACT

A drive and a method, including an electric motor, which is supplied by a rectifier, the rectifier including a time-discrete closed-loop control structure, which regulates the stator current of the electric motor by setting the voltage applied at the motor, the current of the motor being acquired in time-discrete fashion, the closed-loop control structure including a closed-loop controller whose actual value is a first current component of the current, the setpoint input of the closed-loop controller being coupled with at least one upstream setpoint limiter.

16 Claims, 4 Drawing Sheets

U.S. PATENT DOCUMENTS

| | | | |
|---|---|---|---|
| 7,218,490 B2* | 5/2007 | Boeffel | 361/51 |
| 7,653,205 B2* | 1/2010 | Allegro Baumann et al. | 381/313 |
| 7,746,039 B2* | 6/2010 | Hoffmann et al. | 322/89 |
| 2004/0001291 A1* | 1/2004 | Boeffel | 361/31 |
| 2005/0190094 A1* | 9/2005 | Andersen | 341/157 |
| 2007/0107973 A1* | 5/2007 | Jiang et al. | 180/443 |
| 2008/0136380 A1* | 6/2008 | Hoffmann et al. | 322/29 |

FOREIGN PATENT DOCUMENTS

| | | |
|---|---|---|
| DE | 1 941 312 | 3/1971 |
| DE | 195 32 477 | 3/1996 |
| EP | 0 179 356 | 4/1986 |
| JP | 11206199 A * | 7/1999 |
| WO | WO/2005/018086 | 2/2005 |

OTHER PUBLICATIONS

European Patent Office, International Search Report, International Patent Application No. PCT/EP2007/006318, Jan. 17, 2008.

Lorenz R. D. et al., "Motion Control with Induction Motors", Proceedings of the IEEE, IEEE. New York, US, vol. 82, No. 8, Aug. 1, 1994, pp. 1215-1240.

* cited by examiner

DRIVE AND METHOD

FIELD OF THE INVENTION

The present invention relates to a drive and to a method.

BACKGROUND INFORMATION

EP 0 179 356 describes a method for controlling a polyphase machine. According to its FIG. 2, the current and the voltage are acquired at the motor. In the process, components of the actual value of the flow are formed from a closed-loop control structure that corresponds to a modeling of the machine. These are forwarded to a flow controller whose output controls the switching states of the inverter supplying the machine, in the form of actuating variables.

DE 1 941 312 describes a method for controlling an asynchronous machine, in which Hall-effect sensors are used.

DE 195 32 477 describes a method for starting an asynchronous machine, in which the setpoint torque value of zero is specified for the startup.

DE 199 752 describes a method for connecting a rectifier to an asynchronous motor.

SUMMARY

Example embodiments of the present invention provide for improving the control characteristics of an electric drive.

According to example embodiments of the present invention, a drive includes an electric motor, which is supplied by a rectifier, the rectifier including a time-discrete closed-loop control structure, which regulates the stator current of the electric motor by setting the voltage applied at the motor, the current of the motor being acquired in time-discrete fashion, the closed-loop control structure including a closed-loop controller whose actual value is a first current component of the current, the setpoint input of the closed-loop controller being coupled with at least one upstream setpoint limiter.

In this context it may be provided that the setpoint limiter is configured such that the actuating limit of the rectifier, i.e., for example, the voltage actuating limit resulting from the intermediate circuit voltage, is not exceeded. Furthermore, it may be implemented such that no substantial feedback occurs and thus also no oscillation tendency. In addition, despite this, the most rapid adjustment of setpoint changes is possible, and the control characteristics of the electric drive are therefore improved. In particular, it is possible to implement the closed-loop control structure such that the actual value progresses such that it reaches the setpoint value applied at the actual closed-loop controller after precisely one time step in each case, i.e., one time raster, this setpoint, however, being able to be generated from the output signal of the setpoint limiter.

In example embodiments, a time-delay element is disposed between the setpoint input of the closed-loop controller and the output value of the setpoint limiter, in particular for a delay by a single time step. In this context it may be provided that the closed-loop controller is able to be assigned a pilot control, which substantially compensates the changes of the setpoint. Thus, only negligible deviations have to be compensated by the closed-loop controller.

In example embodiments, the closed-loop controller is assigned a pilot control, which adds to the output value of the closed-loop controller a variable that is proportional to the change in the setpoint input. It may be provided in this context that a controlled system having a substantially integrating behavior is already well controllable by the pilot control, so that the closed-loop controller must compensate only for deviations and interference variables.

In example embodiments, the setpoint limiter requires as input variable at least the non-delayed setpoint, the time-delayed setpoint and the output value of the closed-loop controller. It may be provided in this context that the setpoint limiter is implementable such that the actuating limit of the rectifier is able to be taken into account and also at least substantial components of the transfer function of the controlled system, including the motor.

In example embodiments, the closed-loop controller is a dead beat controller, in particular one that is adapted to the motor disposed in the controlled system. In this context it may be provided that the actual value at the closed-loop controller input is able to reach the applied setpoint already in a single time step, i.e., time raster.

In example embodiments, the closed-loop controller is a linear controller such as a P-controller, a PI-controller or a PID-controller, in particular with pilot control. In this context it may be provided that simple, cost-effective closed-loop control structures are able to be used.

In example embodiments, the current components are determined in a coordinate system from the detected current. An advantage in this context is that an adapted coordinate system is able to be used, in particular one that rotates in tandem, so that the computational work is minimal.

In example embodiments, the rectifier includes for each current component a closed-loop control structure, which is substantially identical to the closed-loop control structure for the first current component. In this context it may be provided that overswings are able to be avoided in all current components.

In example embodiments, the pilot control is implemented in the form of a dead beat control, that is to say, it has an inverse behavior with respect to the motor disposed in the controlled system, the actuating limit of the rectifier, in particular, not being taken into account in this context. It may be provided that the pilot control may be provided such that the pilot control is able to make the substantial deviations of the actual variable from the setpoint variable disappear in one time step already.

In example embodiments, setpoint limiter SB limits the setpoint such that the voltage actuating limit is not exceeded, this being carried out in particular such that no other disadvantages arise, such as instabilities of the closed-loop control circuit as a result of additional feedback. In this context it may be provided that no swing behavior occurs and that the setpoint is able to be attained as rapidly as possible nevertheless and without overswings.

In example embodiments, the setpoint limiter is provided such that the restriction to the setpoint is effective only if the output variable, i.e., limited setpoint I_setpoint, runs in the direction of the unlimited setpoint. In this context it may be provided that feedback and thus also oscillatory behavior are suppressed.

In example embodiments, the difference is determined between actuating variable U and actuating limits U_max and U_min of the rectifier, multiplied by a factor 1/K, and added to the time-delayed, i.e., earlier, setpoint I_setpointZ1, this sum being forwarded to a limiter 50 as maximum or minimum value (max, min), as limit value that acts on the non-delayed setpoint I_setpoint. It may be provided in this context that the setpoint is attainable as quickly as possible and without overswings.

In example embodiments, the limiter includes a delay element, which delays its output value by at least one time step, i.e., one time raster, and uses it for variable determination within the limiter. It may be provided in this context that feedback and oscillatory behavior are able to be suppressed.

In example embodiments, the limiter includes means for suppressing feedback. In this context it may be provided that the oscillation behavior is reduced.

In example embodiments, the limiter has as input values the maximum and minimum values (max, min) as well as the non-delayed setpoint I_setpoint, the smaller value being determined from max and input, compared to the delayed output value of the limiter, and the larger value thereof becoming effective as upper limit of the limit element acting on the input, the larger value being determined from min and input, compared to the delayed output value of the limiter, and the smaller value thereof becoming effective as lower limit of the limit element acting on the input. It may be provided in this context that the limit values are a function of the output variable of the closed-loop controller, so that overswings are able to be prevented.

Figure 2:
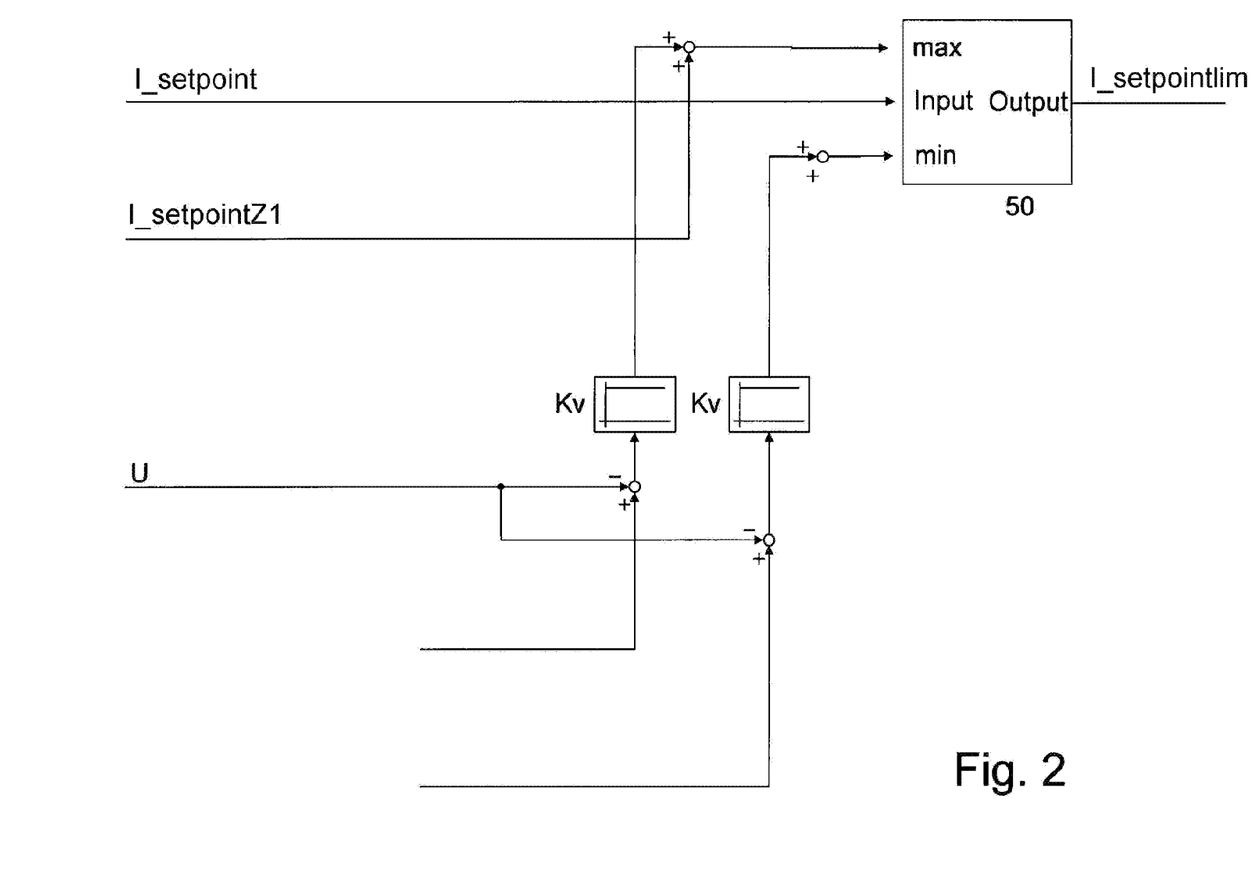
FIG. 2 illustrates a setpoint limiter according an exemplary embodiment of the present invention.
Figure 3:
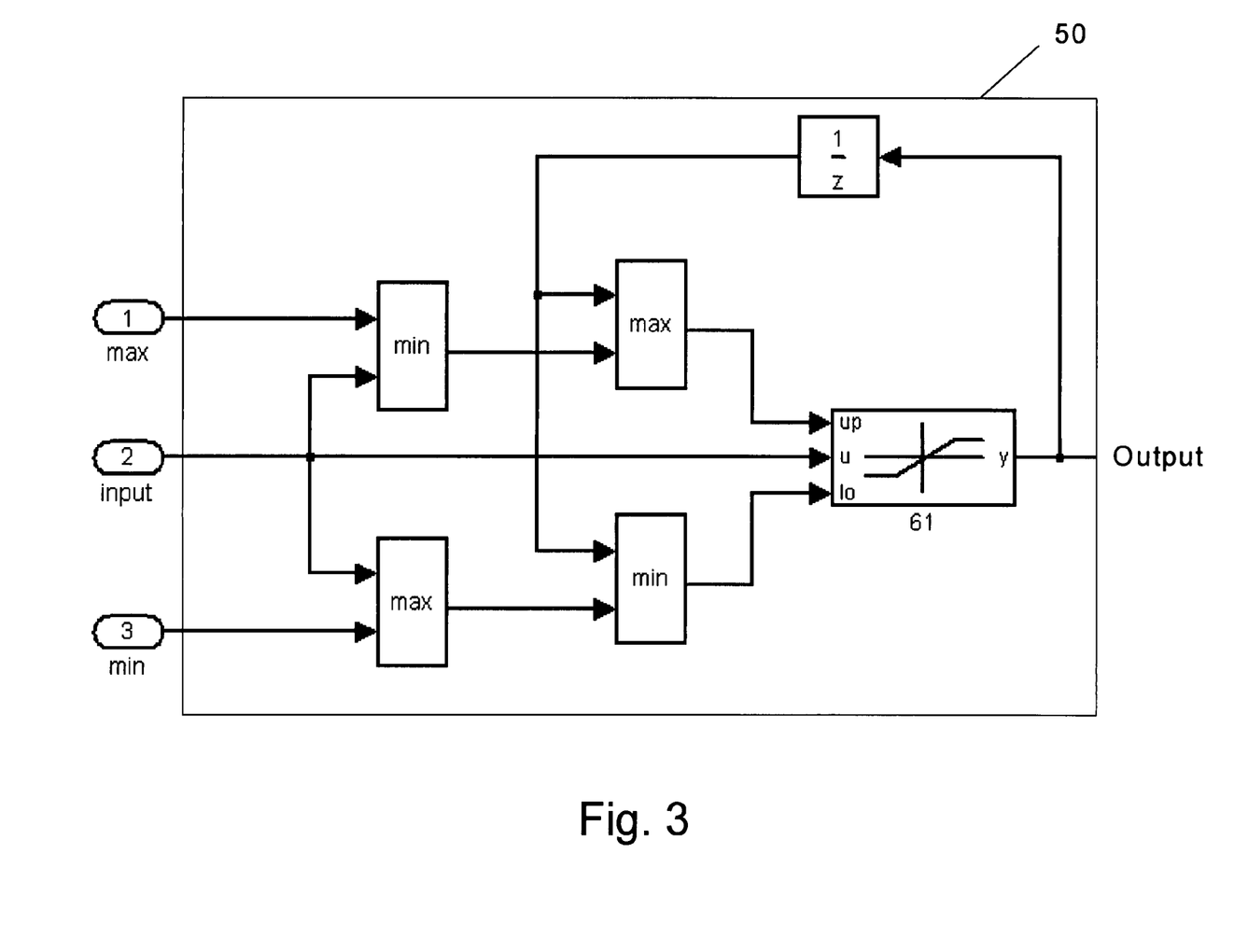
FIG. 3 illustrates a limiter according an exemplary embodiment of the present invention.

In example embodiments, the upper limit of limiter 50 amounts $$\text{to } i_{sollmax,n} = i_{soll,n1} + \frac{1}{K_v} \cdot (U_{max} - u_{r,n})$$

n numbering the time steps, ($U_{max}$) being the voltage actuating limit, ($u_{r,n}$) being the value of output variable U of the closed-loop controller, K having the same value as in pilot control V. It may be provided in this context that parameters of the controlled system, such as K and actuating limit U_max are able to be taken into account to the effect that overswinging is suppressible.

Among features of the present invention in the method are that the method is provided for the closed-loop control of the motor current in an electric motor supplied by a rectifier, the method being implemented in time-discrete fashion, and the stator current of the motor being determined in time-discrete fashion, the stator current of the electric motor being regulated, the actual value of a first current component of the current being regulated to a setpoint input, the setpoint input being the output of a setpoint limiter, the actuating variable of the closed-loop controller being the voltage applied at the motor.

It may be provided in this context that the setpoint limiter is able to be implemented such that it includes parameters that are related to the controlled system and the actuating limit. Overswings are therefore preventable.

LIST OF REFERENCE CHARACTERS

I_setpoint setpoint value
I_actual actual value
I_setpointlim output variable of setpoint limiter SB
U voltage as actuating variable
SR current controller
SA current sampling
V pilot control
R closed-loop controller
M motor
SG voltage actuating limit
SB setpoint limiter
50 limiter
61 limit element

DETAILED DESCRIPTION

Example embodiments of the present invention are explained in greater detail below with reference to the figures.

Figure 1:
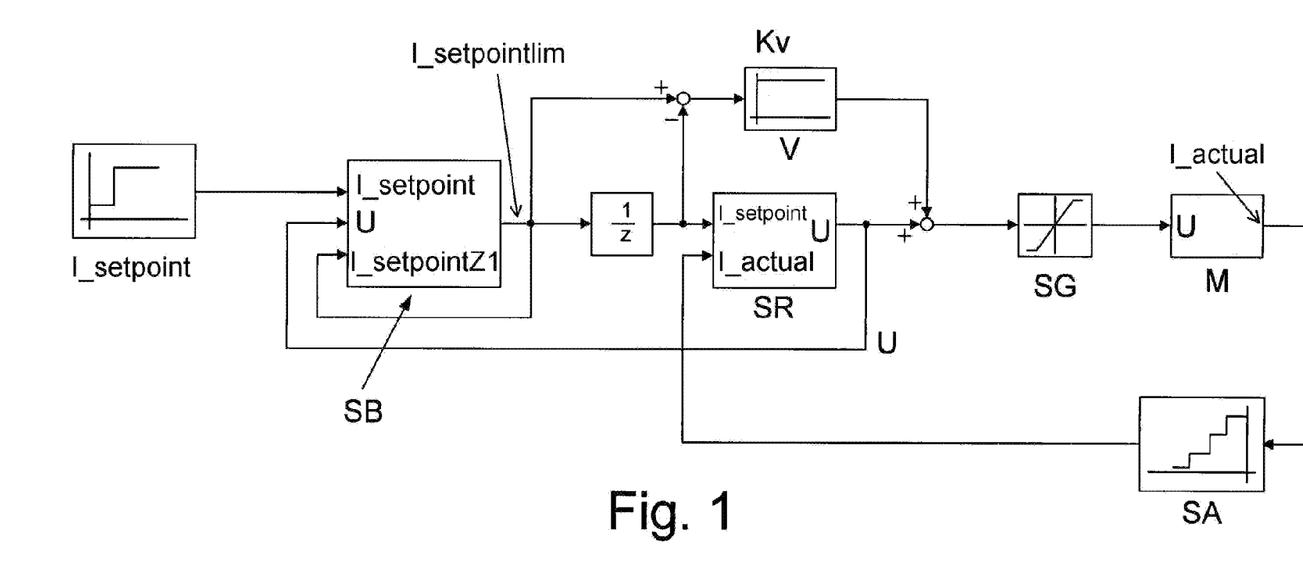
FIG. 1 illustrates a schematic closed-loop control structure according to an exemplary embodiment of the present invention.

FIG. 1 shows a schematic illustration of the closed-loop control structure according to example embodiments of the present invention. Actual current value I_actual is acquired at the electric machine, for instance an electric motor M. This acquisition is implemented in time-discrete manner using current sampling SA, that is to say, once for each time step of the time-discrete closed-loop controller.

Since the current of the machine is a multi-dimensional variable if the machine has a three-phased supply, the current is to be represented as vector.

This vector is representable in a coordinate system, such as a flow coordinate system, rotor coordinate system, etc.

Actual current value I_ACTUAL of the figures is to be understood as current component in this coordinate system.

In the case of multiple current components, one closed-loop control structure according to FIG. 1 is able to be used for each of these current components. In any event, however, a closed-loop control structure according to FIG. 1 must be used for the torque-generating current component as I_ACTUAL, in particular.

Setpoint I_setpoint and actual value I_ACTUAL are forwarded to the current closed-loop controller, which modifies the actuating variable in accordance with the system deviation. In the case at hand, the mentioned actuating variable preferably is voltage U, i.e., the amount of the voltage vector of the supply of motor M.

Important in example embodiments of the present invention is that the setpoint input for closed-loop controller SR is forwarded to the closed-loop controller with a time delay. Since the new setpoint input is already known at the new instant, this makes it possible for the closed-loop control structure to influence the output variable of closed-loop controller SR as desired in time synchronism with the new setpoint input via a pilot control V. According to the physical laws of the controlled system including motor M, this then causes a change in the detected current-component actual value I_ACTUAL, which is forwarded to closed-loop controller SR as actual value. Thus, when looking at the time-discrete closed-loop control structure, it is clearly established that the actual value and the setpoint input of closed-loop controller SR belong to the same time raster, i.e., time step.

Example embodiments of the present invention have the feature that the controlled system may be seen as integration member in a rough approximation, because the motor in any event has an inductivity as important feature. According to FIG. 1, pilot control V receives the difference from the time-delayed and the undelayed setpoint input, that is to say, the change in the setpoint input. Thus, when proportionality factor Kv has been set correctly, the integrating behavior of the controlled system is simulated directly. Only small deviations and disturbance variables must then still be corrected by closed-loop controller SR.

Speaking in general terms, the closed-loop control structure according to example embodiments of the present invention thus includes a closed-loop controller whose setpoint input becomes effective with a time delay, and a dead beat pilot control, which takes effect without time delay, is connected in parallel with the closed-loop controller.

It is also important in example embodiments of the present invention that actuating variable U is subject to an actuating limit since it is impossible to generate randomly high voltages in the rectifier supplying the motor. Overswinging of the current value in example embodiments of the present invention is avoidable nevertheless and thus also the reaching of the current limit and the attendant emergency shut-off operations and error reports.

Actual closed-loop controller SR receives only the delayed setpoint input and compares it to the actual value variable that is more recent by at least one time step.

It is important in example embodiments of the present invention that specified setpoint I_setpoint is processed and that only the result of this processing is transmitted to the closed-loop controller. A setpoint limiter SB is used in this context.

This setpoint limiter SB prevents the actuating limit of the actuating variable from being exceeded. In the process, the setpoint is restricted such that voltage actuating limit SG will not be exceeded, which is accomplished such that no other disadvantages result, for instance instabilities of the closed-loop control circuit by additional feedback.

Setpoint limiter SB uses as input variables the output variable U of the closed-loop controller, non-delayed actual setpoint I_setpoint, and delayed, i.e., earlier, setpoint I_setpoint Z1.

The setpoint limiter acts such that the limitation to the setpoint takes effect only when the output variable, i.e., limited setpoint I_setpoint, runs in the direction of the unlimited setpoint. The output variable of setpoint limiter SB is denoted by I_setpointlim.

A detailed exemplary embodiment of the setpoint limiter is shown in FIG. 2, and FIG. 3 shows an exemplary embodiment of limiter 50.

FIG. 2 illustrates that the difference between actuating variable U and actuating limits U_max and U_min of the rectifier is determined, multiplied by a factor 1/K, and added to the time-delayed, i.e., earlier, setpoint I_setpoint Z1. The result is forwarded to a limiter 50 as maximum or minimum value (max, min). Furthermore, the non-delayed setpoint I_setpoint is likewise forwarded to limiter 50, as input variable input.

FIG. 2 thus considers the correlation $$i_{sollmax,n} = i_{soll,n-1} + \frac{1}{K_v} \cdot (U_{max} - u_{r,n}),$$

n numbering the time steps, ($U_{max}$) being the voltage actuating limit, ($u_{r,n}$) being the value of output variable U of the closed-loop controller, K having the same value as in pilot control V. An analogous correlation applies to the lower limit.

Limiter 50 is shown in greater detail in FIG. 3.

The smaller value is determined from input and max. Then the larger value is determined therefrom and from the delayed output value of limiter 50. This value then becomes effective as upper limit value.

In the same manner the greater value is determined from input and min. Then the smaller value is determined therefrom and from the delayed output value of limiter 50. This value then becomes effective as lower limit value.

In the process, the input is acting on the upper and lower limit values in limit element 61.

In FIG. 2, it is also possible to use a known standard limit element as limiter 50, which limits the input to the extreme values of max and min. However, in this case oscillatory behavior of the closed-loop control structure due to inherent feedback may arise. Therefore, it may be provided to implement limiter 50 according to FIG. 3. However, other oscillation-suppressing measures may be taken as well.

Figure 4:
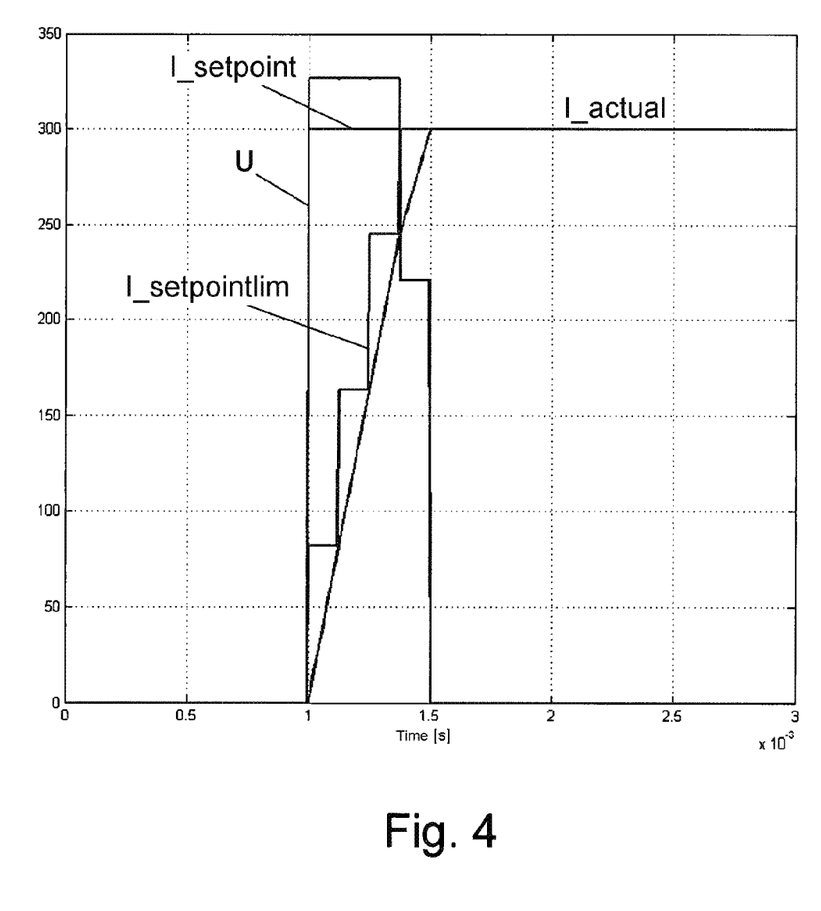
FIG. 4 illustrates curves of a setpoint value, a limited setpoint value, an actual value, and an actuating variable according to an exemplary embodiment of the present invention.

FIG. 4 shows an exemplary curve of the values of the variables, the setpoint limitation taking effect in a sudden change of the reference variable. The limited setpoint behaves precisely such that the actual value attains it after one sampling raster. In this manner, the system deviation of closed-loop controller SR remains zero during the entire correction, and the integrator of closed-loop controller SR does not change its value. This prevents overswings of the actual value.

In an exemplary embodiment according to the present invention, the time delay is implemented as precisely one time step, i.e., one time raster, of the time-discrete closed-loop control structure.

The closed-loop controller is implementable in the form of a time-discrete dead beat controller. The closed-loop controller is realized such that it is able to compensate the system deviation already in a single time step. This is successful at least in those instances where the closed-loop controller has a transfer function of the Z-transformed form $1/(z*G(z))$, G being the transfer function of the controlled system.

What is claimed is:

1. A drive, comprising:
   an electric motor; and
   a rectifier adapted to supply to the motor, the rectifier including a time-discrete closed-loop control structure adapted to regulate stator current of the electric motor by setting a voltage applied at the motor, a current of the motor acquirable in time-discrete fashion
   wherein the closed-loop control structure includes a closed-loop controller having an actual value as a first current component of the current, a setpoint input of the closed-loop controller coupled with at least one upstream setpoint limiter; and
   further comprising a time-delay device arranged between the setpoint input of the closed-loop controller and an output value of the setpoint limiter, for a delay by a single time step.

2. The drive according to claim 1, wherein the closed-loop controller is assigned a pilot control adapted to add to an output value of the closed-loop controller a variable that is proportional to a time change in the setpoint input.

3. The drive according to claim 1, wherein the closed-loop controller is at least one of (a) arranged a dead beat controller and (b) is adapted to the motor.

4. The drive according to claim 1, wherein the closed-loop controller includes at least one of (a) a linear controller, (b) a P-controller, (c) a PI-controller, (d) a PID-controller, and (e) a controller with pilot control.

5. The drive according to claim 1, wherein current components are determined in a coordinate system from an acquired current.

6. The drive according to claim 1, wherein the setpoint limiter is adapted to limit a setpoint such that a voltage actuating limit is not exceeded.

7. The drive according to claim 1, wherein the setpoint limiter is provided such that a limitation to a setpoint takes effect only when an output variable runs in a direction of an unlimited setpoint.

8. The drive according to claim 1, wherein the limiter includes a feedback suppression device.

9. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein the setpoint limiter requires as input variable a non-delayed setpoint, a time-delayed setpoint, and an output value of the closed-loop controller.

10. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein the rectifier includes for each current component a closed-loop control structure, which is similar to the closed-loop control structure for the first current component.

11. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein a pilot control is implemented in the form of a dead beat control, having an inverse behavior with respect to the motor disposed in the controlled system, an actuating limit of the rectifier not being taken into account.

12. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein a difference between an actuating variable and actuating limits of the rectifier is determined, multiplied by a factor 1/K, and added to a time-delayed, earlier, setpoint, a sum being forwarded to a limiter as one of (a) a maximum and (b) a minimum value, as a limit value that acts on the non-delayed setpoint.

13. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein the limiter includes a delay device adapted to delay an output value by at least one time step and uses it for variable determination within the limiter.

14. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein the limiter has as input values a maximum and a minimum value as well as the non-delayed setpoint, a smaller value being determined from the maximum and input, compared to a delayed output value of the limiter, and a larger value thereof taking effect as an upper limit of a limit device acting on the input, the larger value being determined from the minimum and input, compared to a delayed output value of the limiter, and the smaller value thereof taking effect as lower limit of the limit device acting on the input.

15. A drive, comprising:
an electric motor; and
a rectifier adapted to supply to the motor, the rectifier including a time-discrete closed-loop control structure adapted to regulate stator current of the electric motor by setting a voltage applied at the motor, a current of the motor acquirable in time-discrete fashion
wherein the closed-loop control structure includes a closed-loop controller having an actual value as a first current component of the current, a setpoint input of the closed-loop controller coupled with at least one upstream setpoint limiter; and
wherein an upper limit of the limiter amounts to $$i_{sollmax,n} = i_{soll,n-1} + \frac{1}{K_v} \cdot (U_{max} - u_{r,n}),$$

n numbering the time steps, ($_{Umax}$) being the voltage actuating limit, ($U_{r,n}$) being the value of the output variable of the closed-loop controller, K having the same value as in the pilot control.

16. A method for regulating motor current in an electric motor supplied by a rectifier, comprising:
acquiring a stator current of the motor in time-discrete fashion; and
regulating the stator current of the motor;

wherein an actual value of a first current component of the current is regulated toward a setpoint input, the setpoint input being an output of a setpoint limiter, an actuating variable of a closed-loop controller being a voltage applied at the motor;
wherein the method is implemented in time-discrete fashion; and further comprising delaying the setpoint input by a single time step by a time-delay device arranged between the setpoint input of the closed-loop controller and an output value of the setpoint limiter.

* * * * *